US006770831B1

(12) United States Patent
Rojas et al.

(10) Patent No.: US 6,770,831 B1
(45) Date of Patent: Aug. 3, 2004

(54) METHOD AND SYSTEM FOR REROUTING ITEMS IN A MAIL DISTRIBUTION SYSTEM

(75) Inventors: John W. Rojas, Norwalk, CT (US); Deborra J. Zukowski, Yorktown, NY (US)

(73) Assignee: Pitney Bowes Inc., Stamford, CT (US)

( * ) Notice: Subject to any disclaimer, the term of this patent is extended or adjusted under 35 U.S.C. 154(b) by 204 days.

(21) Appl. No.: 10/017,003

(22) Filed: Dec. 14, 2001

(51) Int. Cl.[7] .............................. B07C 5/00; G06K 9/00

(52) U.S. Cl. ........................ 209/584; 209/900; 209/583; 700/219; 700/220; 700/221; 700/223; 700/225

(58) Field of Search ................................ 209/583, 584, 209/900; 700/219–221, 223–227

(56) References Cited

U.S. PATENT DOCUMENTS 5,043,908 A * 8/1991 Manduley et al. .......... 700/227
5,971,587 A * 10/1999 Kato et al. .................. 700/115

* cited by examiner

*Primary Examiner*—Donald P. Walsh
*Assistant Examiner*—Jonathan R Miller
(74) *Attorney, Agent, or Firm*—Steven J. Shapiro; Angelo N. Chaclas

(57) ABSTRACT

A method for rerouting mailpieces in a carrier distribution system includes the steps of receiving a plurality of mailpieces within the carrier distribution system; dynamically determining criteria defining a suspect group of mailpieces; automatically detecting the presence of the plurality of mailpieces within the carrier distribution system; identifying suspect mailpieces form the plurality of mailpieces by automatically detecting within the carrier distribution system which of the plurality of mailpieces meet the criteria defining the suspect group of mailpieces; and outsorting the suspect mailpieces for evaluation. A postal distribution system incorporates the method.

17 Claims, 2 Drawing Sheets

METHOD AND SYSTEM FOR REROUTING ITEMS IN A MAIL DISTRIBUTION SYSTEM

BACKGROUND OF THE INVENTION

In current postal and other carrier distribution systems there may be times when it is desirable to collectively retrieve groups of items from the distribution system prior to their final delivery. The decision to retrieve the groups of items is based on information about one of the items that brings into question whether the remaining items of the group should be delivered. For example, if a letter contaminated with a biological agent is identified, it may indicate that other such letters are being distributed. Accordingly, if a group of letters can be identified that are potentially contaminated, it would be desirable to redirect these letters outside of the normal distribution channel for subsequent evaluation. Currently, however, there is no way to effectively retrieve these individual letters once they have been introduced into the postal distribution system.

While the above paragraph addressed the contamination problem, there are other situations where it would be advantageous to be able to retrieve items from the distribution system. For example, suppose a drug manufacturer who distributed drugs through the postal system determined that a serious problem existed in connection with a particular drug that had recently been distributed. The drug manufacturer would want to retrieve the recently shipped orders as soon as possible to preclude them from reaching the patent.

In view of the above, what is needed is a method for effectively Identifying and retrieving groups of items from a carrier distribution system.

SUMMARY OF THE INVENTION

A method for rerouting mailpieces in a carrier distribution system includes the steps of receiving a plurality of mailpieces within the carrier distribution system; dynamically determining criteria defining a suspect group of mailpieces; automatically detecting the presence of the plurality of mailpieces within the carrier distribution system; identifying suspect mailpieces from the plurality of mailpieces by automatically detecting within the carrier distribution system which of the plurality of mailpieces meet the criteria defining the suspect group of mailpieces; and outsorting the suspect mailpieces for evaluation. A postal distribution system incorporates the method.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
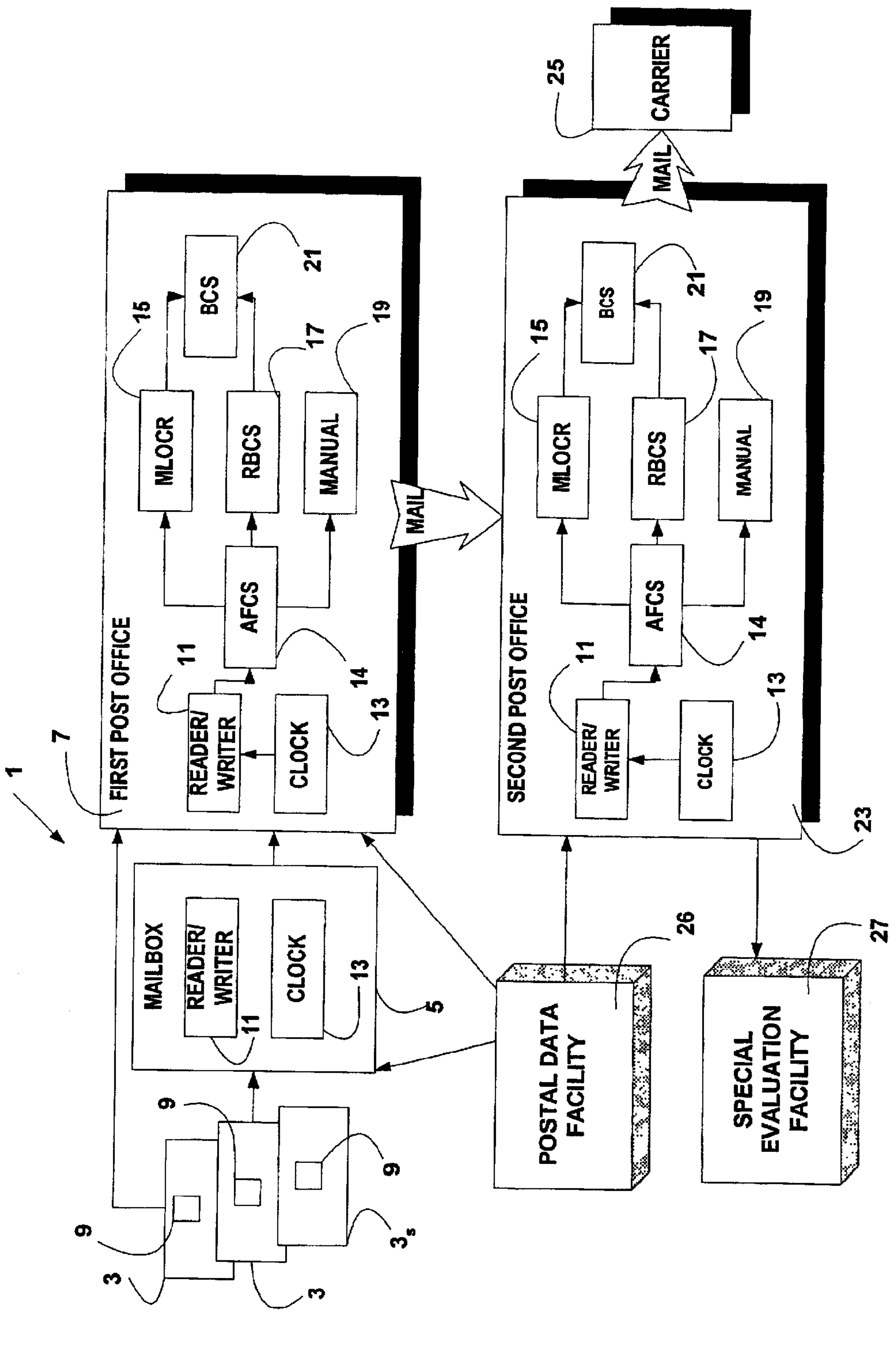
FIG. 1 shows the inventive method incorporated in a postal distribution system.
Figure 2:
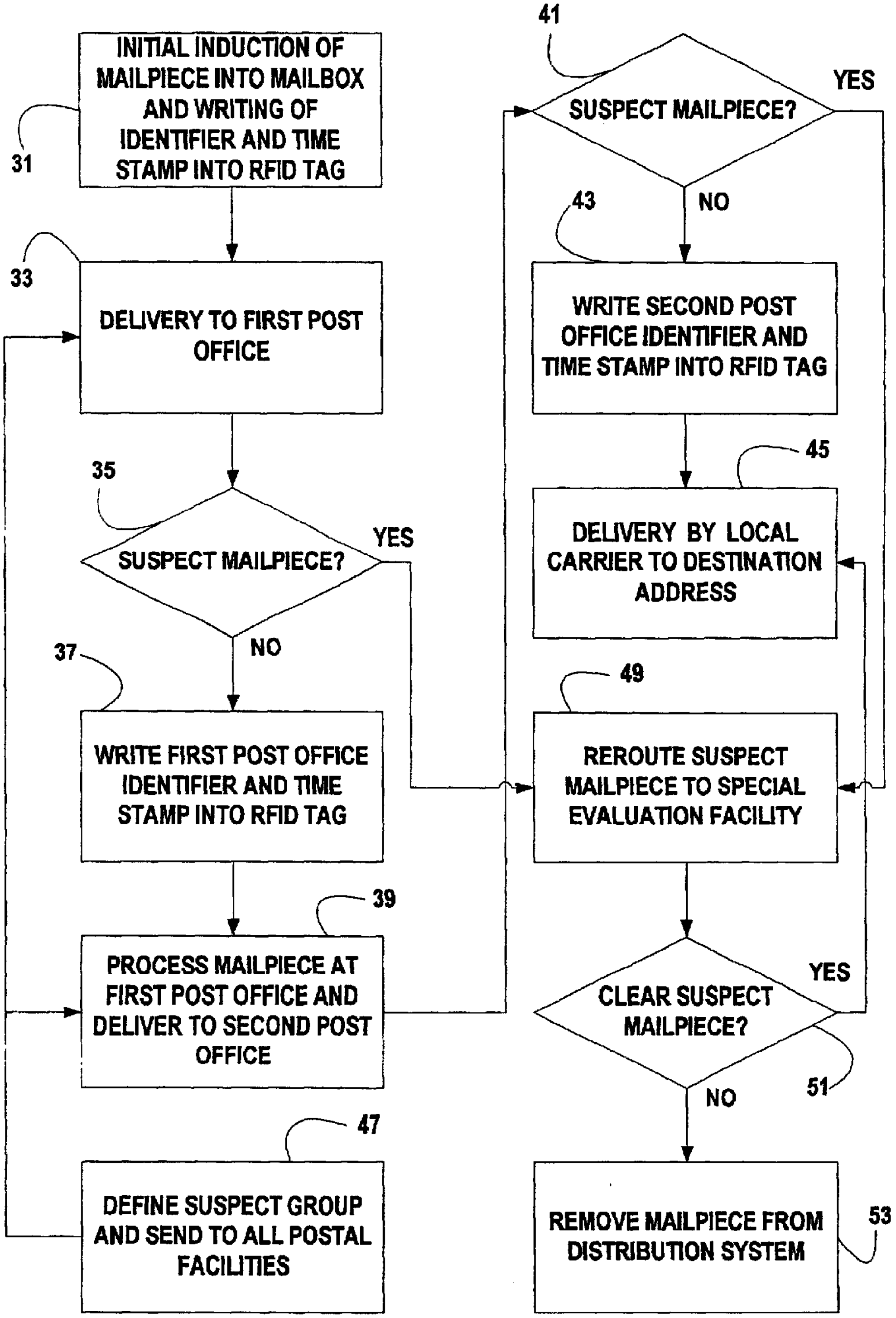
FIG. 2 is a flowchart of the inventive method.

Referring to FIGS. 1 and 2, the inventive mailpiece distribution system 1 will be described. The mailpiece distribution system 1 includes a plurality of mailpieces 3 (which may include one or more suspect mailpieces 3, which are discussed further below) that are delivered directly to a mailbox 5 or a first post office 7. Each mailpiece 3 contains a Radio Frequency Identification Tag (RFID Tag) 9 that can be written to and read from in order to exchange information with an RFID Tag reader/writer such as the ones shown at numeral 11 in FIG. 1.

The RFID Tag 9 is known and generally includes a semiconductor chip having RF circuits and antenna, logic, and memory. Passive RFID Tags do not have their own power source and derive the power they need to operate from the RF signal that comes from the RFID reader/writer 11. Active RFID Tags contain their own power source such as a battery. The instant invention envisions the use of either the active or passive type of RFID Tags. In either case, the RFID Tag 9 and RFID reader/writer 11 can exchange data using coded RF signals without any physical contact between the devices. Since the use of RFID Tags and their interrelationship with an RFID Tag reader/writer is well known in the art, no further discussion of their structure and operation is considered necessary for an understanding of the instant invention.

Returning to the processing of the mailpieces 3, when, for example, the mailbox 5 is opened to receive a mailpiece 3 the reader/writer 11 will send an RF signal to the RFID Tag 9. The RF signal provides mailbox identifying data and a time stamp based on a date/time received from a clock 13 at the time of induction of the mailpiece 3 Into the mailbox 5. The RFID Tag 9 stores this time and identifying data in its memory (step 31). The mailpiece 3 is then collected from the mailbox 5 and delivered to the first postal facility 7 (local post office) (step 33). At the first postal facility 7, the mailpiece 3 is processed past another reader/writer 11 which determines, in a manner discussed in more detail further below) if the mailpiece 3 is a suspect mailpiece $\mathbf{3}_s$ (step 35). If the mailpiece 3 is not a suspect mailpiece 3*s* the reader/writer 11 writes into the memory of the RFID tag 9 the first postal facility identifier data and a time stamp (obtained from clock 13) showing the date /time of induction of the mailpiece 3 at the first postal facility 7 (step 37).

Once the mailpiece 3 has been tagged at the first postal facility 7, it is processed in the normal manner. That is, it is sent to a facer canceller 14 which faces all of the mailpieces 3 in the same direction and sends them to either a multiple line optical character reader (MLOCR) 15, a remote bar code system (RBCS) 17 or a manual processing station 19.

The mailpieces 3 that go to the MLOCR 15 and RBCS 17 will be sent to bar code sorters 21 (BCS) where they are sorted into groups depending upon the destination zip code that is obtained from a reading of the postnet barcode on the mailpiece 3. The manually processed mailpieces are also sorted based on destination zip codes. In either case, once the sorting and grouping of mailpieces 3 is completed, the mailpieces 3 are sent (by truck, plane, etc.) to a second postal facility 23 located near the final destination delivery address of the mailpiece 3 (step 39). For ease of explanation, only the initial and final postal facilities (first and second post offices 7, 23) are shown. However, depending upon the sending and receiving locations of each mailpiece 3, there may be numerous other postal facilities through which the mailpieces 3 are processed prior to reaching the final postal facility 23. These other postal facilities may include local post offices and/or major postal distribution centers. Each of these postal facilities can be equipped with the reader/writer 11 and clock 13 thereby permitting them to write into the memory of RFID tags 9 the facility identifying and time stamp data associated with the induction of the mailpiece 3 at the specific postal facility 9.

Upon induction of the mailpieces 3 at the second postal facility 23 they are once again read at the reader/writer 11 to determine if they are a suspect mailpiece $3_s$ (step 41). If the mailpiece 3 is not a suspect mailpiece $3_s$, its RFID Tag 9 is tagged with the identifying data of the second postal facility 23 and an induction timestamp data by the RF reader/writer 11 (step 43) and sorted in a conventional manner for delivery by a specific postal carrier 25 to the destination address (step 45). Accordingly, the mailpiece 3 reaches the carrier 25 with each facility or mailbox induction point and associated timestamp listed in the memory of the RF ID Tag 9.

While the above description shows the processing of a normal mailpiece 3 through the inventive mailpiece distribution system 1, the suspect mailpieces $3_s$ within the mailpiece distribution system 1 can readily be identified and rerouted for evaluation prior to final delivery. The suspect mailpieces $3_s$ are all mailpieces 3 falling within a defined "suspect group". For example, if a particular mailpiece 3 is identified as being contaminated with a biological agent, it is desirable to collect and evaluate other potentially contaminated letters prior to their final delivery. Accordingly, based on information about the contaminated mailpiece 3, a "suspect group" of suspect mailpieces $3_s$ can be defined. Additionally, the suspect group could be defined as all mailpieces 3 that were inducted at a specific postal facility or mailbox. The suspect group could be further defined as only including those mailpieces 3 inducted at the specific mailbox or postal facility within a certain timeframe. In any event, the suspect group is created by dynamically determining criteria defining the suspect group. While the description above uses routing information as the determining criteria, the criteria can be based on any information that is stored in the RFID Tags 9.

Once the "suspect group" has been defined, data identifying the suspect group (e.g. mailbox or facility ID) is sent from a postal data facility 26 to all postal facilities in the mailpiece distribution system 1 (step 47). This information is passed to the reader/writer 11 at each postal facility so that as the RFID tags 9 on individual mailpieces 3 are read at each postal facility, all suspect mailpieces $3_s$ can be identified and outsorted for special handling and evaluation. Thus, any postal facility that detects that any mailpiece 3 was inducted at the specific postal facility or mailbox defining the suspect group will outsort that mailpiece 3 as a suspect mailpiece $3_s$. For example, if the answer is YES at steps 35 and 41, the suspect mailpiece $3_s$ is rerouted to a special evaluation facility 27 for inspection (step 49). If the result of the inspection (step 51) is that the suspect mailpiece 38 has been cleared (no longer suspect), it is placed back into the postal distribution system 1 for final delivery by the postal carrier 25 (step 45). However, if the suspect mailpiece $3_s$ is not cleared at step 51, it is removed from the postal distribution system 1 and handled as is appropriate depending on the nature of the suspect group (step 53).

The inventive postal distribution system 1 can take further advantage of the RFID Tag 9 by including in the memory of the RFID Tag 9 a flag location which can be set by the reader/writer 11 when a suspect mailpiece $3_s$ has been identified. The setting of the suspect flag identifies the mailpiece 3 to all reader/writers 11 as being a suspect mailpiece and automatically triggers the rerouting of the suspect mailpiece 3 to the special evaluation facility 27. Accordingly, the suspect mailpiece $3_s$, is rerouted using the existing facilities of the postal distribution system 1.

In yet another embodiment, the use of a plurality of special purpose flags can add even more flexibility to the inventive postal distribution system 1. For example, a special contamination flag can be used in the case of a mailpiece $3_s$ suspected of being contaminated with a chemical or biological agent. The setting of the contamination flag indicates a very specific handling procedure which likely would include a manual outsort at the point of detection. On the other hand, where it is simply desirable to have certain mailpieces returned to the sender (such as the drug recall discussed above), a different flag can be used. The return to sender flag indicates that the item should be rerouted to the sender address versus the destination address thereby making use of the normal processing facilities of the postal distribution system 1. In this situation, at step 53 the mailpiece 3, is not removed from the postal distribution system 1 but is simply rerouted.

In yet another embodiment, different flag identifiers can be tied to different suspect groups with special routing instructions attached to the flag identifier. That is, once a suspect group is identified at the database 26, the suspect group with the routing instructions can be supplied by the database 26 to all of the postal facilities. A specific flag can be associated with the suspect group/routing information as well. Therefore, when a specific flag is detected at a postal facility, it can ascertain the desired rerouting information. As an alternative, the rerouting information can be written directly into the RFID Tag 9 and detected. However, if the rerouting information is included, more memory is required in the RFID tag 9.

The inventive postal distribution system 1 can also ensure that each postal facility sends to the database 25 the induction point/timestamp listings for each detected suspect mailpiece 3 so that potential other suspect groups may be identified based on potential cross-contamination.

While the above description identifies discrete physical points of induction that can be identified as a suspect group, there may be various suspect groups that can be aggregated into a single larger "neighborhood suspect group". For example, the neighborhood suspect group may involve several mailboxes or several local post offices. Thus, any mailpieces 3 from the neighborhood suspect group would be rerouted upon identification.

Additionally, there is no reason why the mailpieces 3 having the RFID tag 9 could not be reused. That is, the carrier 25 can have a hand-held reader/writer that can be used to set a delivered flag to show that delivery at the final destination address has been completed. When the mailpiece 3 is reused, the delivered flag will be detected at the first induction point and reset and all previously stored routing information in the RFID Tag 9 is erased. The use of the delivered flag ensures that the tracking information is available at the final delivery destination of the mailpiece 3 in the event that the recipient of the mailpiece 3 was the first to discover a problem with the mailpiece 3 (potentially contaminated).

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims. For example, the RFID tag can also be a smart card that includes its own microprocessor. Further, the reader/writer can be included at individual in processing stations (e.g. MLOCR, BCS) so that identification of induction points down to the equipment level is obtained. In this situation, the neighborhood suspect group may involve several processing stations. Additionally, the trays and transportation vehicles used to transport the mailpieces can include the reader/writer so that these facilities can be identified against a specific mailpiece and be identified as part of the suspect group.

Furthermore, while a representative postal system is shown, the instant invention is applicable to any public or private carrier system and a mailpiece can include letters, packages, or any other item being distributed through the carrier system. Finally, the placement of the reader/writer within the processing sequence of the postal facility can be changed to accommodate where in the processing the detection of suspect mailpieces is preferred.

What is claimed is:

1. A method for rerouting mailpieces in it carrier distribution system comprising the steps of:

receiving a plurality of mailpieces within the carrier distribution system;

dynamically determining a criteria defining a suspect group of mailpieces;

identifying suspect mailpieces from the plurality of mailpieces by automatically detecting within the carrier distribution system which of the plurality of mailpieces meet the criteria defining the suspect group of mailpieces; and outsorting the suspect mailpieces for evaluation.

2. A method as recited in claim 1, further comprising determining the criteria defining the suspect group of mailpieces based on a place of induction of mailpieces within the carrier distribution system.

3. A method as recited in claim 2, wherein the place of induction is one of a carrier receptacle and a carrier facility.

4. A method as recited in claim 2, wherein the suspect group is a neighborhood suspect group that is defined by determining the criteria defining the suspect group based on a plurality of places of induction of mailpieces within the carrier distribution system.

5. A method as recited in claim 2, wherein the suspect mailpieces are outsorted to a special evaluation facility.

6. A method as recited in claim 2, wherein the outsorting of the suspect mailpieces includes automatically rerouting the suspect mailpieces within the carrier distribution system for delivery to a location different from the destination addresses associated with each of the suspected mailpieces.

7. A method as recited in claim 2, wherein the plurality of mailpieces each include a corresponding RFID Tag and further comprising for each one of the plurality of mailpieces writing to its corresponding RFID Tag an identifier of a least one of a plurality of processing location of the carrier distribution system through which the each one of the plurality of mailpieces was inducted.

8. A method as recited in claim 7, further comprising reading the corresponding RFID Tags to determine it any of the plurality of mailpieces includes an identifier for the place of induction upon which the suspect group is defined.

9. A method as recited in claim 8, further comprising identifying as suspect mailpieces any of the plurality of mailpieces determined to include an identifier for the place of induction upon which the suspect group is defined.

10. A method as recited in claim 9, wherein the carrier distribution system is a postal distribution system.

11. A method as recited in claim 9, further comprising setting a routing flag in the RFID tag of each identified suspect mailpiece which indicates a destination to which the suspect mailpieces are to be routed.

12. A method as recited claim 11, further comprising reading the routing flag of each suspect mailpiece and automatically routing the mailpiece to the destination.

13. A method as recited in claim 12, further comprising delivering each of the plurality of mailpieces not identified as suspect mailpieces to a destination address and setting a final delivery flag in the RFID Tag of each of the plurality of mailpieces delivered to the destination address.

14. A method as recited in claim 2, wherein the criteria defining the suspect group is further determined based on the place of induction and a timeframe of induction of mailpieces at the place of induction.

15. A method as recited in claim 14, wherein the plurality of mailpieces each include a corresponding RFID Tag and further comprising for each one of the plurality of mailpieces writing to is corresponding RFID Tag an identifier of at least one of a plurality of processing locations of the carrier distribution system through which the each one of the plurality of mailpieces was inducted and a corresponding time of induction.

16. A method as recited in claim 15, further comprising reading the corresponding RFID Tags to determine if any of the plurality of mailpieces includes an identifier for the place of induction upon which the suspect group is defined and a time of induction that falls within the timeframe, and identifying as suspect mailpieces all of the plurality of mailpieces determined to include in the corresponding RFID Tags the identifier of the place of induction upon which the suspect group is defined and the time which falls within the timeframe.

17. A postal distribution system comprising:

a first facility at which a mailpieces including an RFID Tag is inducted, the first facility including means for writing to the RFID Tag an identifier of the first facility; and a second facility that receives the mailpiece after is processing through the first facility, the second facility including means for reading the RFID Tag to obtain the identifier and to determined based on the identifier if the mailpiece is a suspect mailpiece included as part of group of suspect mailpieces which group of suspect mailpieces is based at least in part on a place of mailpieces within the postal distribution system, and means for setting in the RFID tag a readable indicator of the rerouting of the mailpiece to an address different from the delivery address of the mailpiece.

* * * * *